United States Patent
Smeltz

(10) Patent No.: US 10,619,257 B2
(45) Date of Patent: Apr. 14, 2020

(54) METHOD OF TREATING LIQUID ELECTROLYTE SOLUTION

(71) Applicant: United Technologies Corporation, Farmington, CT (US)

(72) Inventor: Andrew Smeltz, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 182 days.

(21) Appl. No.: 15/562,013

(22) PCT Filed: Apr. 3, 2015

(86) PCT No.: PCT/US2015/024186
§ 371 (c)(1),
(2) Date: Sep. 27, 2017

(87) PCT Pub. No.: WO2016/160028
PCT Pub. Date: Oct. 6, 2016

(65) Prior Publication Data
US 2018/0105944 A1    Apr. 19, 2018

(51) Int. Cl.
| | |
|---|---|
| *C25B 15/08* | (2006.01) |
| *C25B 1/00* | (2006.01) |
| *C01G 31/00* | (2006.01) |
| *C01G 31/02* | (2006.01) |
| *H01M 8/18* | (2006.01) |

(52) U.S. Cl.
CPC ............. *C25B 15/08* (2013.01); *C01G 31/00* (2013.01); *C01G 31/02* (2013.01); *C25B 1/00* (2013.01); *H01M 8/188* (2013.01); *Y02E 60/366* (2013.01); *Y02E 60/528* (2013.01); *Y02P 20/133* (2015.11)

(58) Field of Classification Search
CPC ........... C25B 1/00; C25B 15/08; C01G 31/00; C01G 31/02; H01M 8/188; H01M 12/06; Y02P 20/133; Y02E 60/366; Y02E 60/528
See application file for complete search history.

(56) References Cited

U.S. PATENT DOCUMENTS

| | | | | |
|---|---|---|---|---|
| 4,159,366 A | * | 6/1979 | Thaller | H01M 8/188 429/101 |
| 4,265,721 A | | 5/1981 | Hackmyer | |
| 5,258,241 A | * | 11/1993 | Ledjeff | H01M 8/04186 429/107 |
| 5,368,762 A | | 11/1994 | Sato et al. | |
| 6,562,514 B1 | | 5/2003 | Kazacos et al. | |
| 2002/0043194 A1 | * | 4/2002 | Kinzenbaw | A01C 7/04 111/54 |
| 2008/0268310 A1 | * | 10/2008 | Ku | C25B 1/04 429/480 |
| 2009/0057162 A1 | * | 3/2009 | Balagopal | C25B 1/04 205/450 |
| 2018/0138567 A1 | * | 5/2018 | Perry | H01M 4/20 |

FOREIGN PATENT DOCUMENTS

| | | |
|---|---|---|
| WO | 1989005363 | 6/1989 |
| WO | 2007110663 | 10/2007 |
| WO | 2013048383 | 4/2013 |
| WO | 2013104664 | 7/2013 |

OTHER PUBLICATIONS

Hosseiny, S.S., Saakes, M., Wessling, M.-A polyelectrolyte membrane-based vanadium/air redox flow battery, Electrochemistry Communications 13 (2011), pp. 751-754 (Year: 2011).*
International Search Report and Written Opinion for International Application No. PCT/US15/24186 completed Jun. 12, 2015.
International Preliminary Report on Patentability for International Application No. PCT/US15/24186 dated Aug. 2, 2017.
Extended European Search Report for European Patent Application No. 15888031.0 completed Nov. 28, 2018.

* cited by examiner

*Primary Examiner* — Anca Eoff
(74) *Attorney, Agent, or Firm* — Carlson, Gaskey & Olds, P.C.

(57) ABSTRACT

A method for treating a liquid redox electrolyte solution for use in a flow battery includes feeding a liquid redox electrolyte solution into a first half-cell of an electrochemical cell and feeding a gaseous reductant into a second half-cell of the electrochemical cell, and electrochemically reducing at least a portion of the liquid redox electrolyte solution in the electrochemical cell using the gaseous reductant.

12 Claims, 1 Drawing Sheet

METHOD OF TREATING LIQUID ELECTROLYTE SOLUTION

BACKGROUND

Flow batteries, also known as redox flow batteries or redox flow cells, are designed to convert electrical energy into chemical energy that can be stored and later released when there is demand. As an example, a flow battery may be used with a renewable energy system, such as a wind-powered system, to store energy that exceeds consumer demand and later release that energy when there is greater demand. Flow batteries are distinguished from other electrochemical devices by, inter cilia, the use of one or more externally-supplied, liquid electrolyte solutions that include reactants that participate in reversible electrochemical reactions.

A typical flow battery includes a redox flow cell that has a negative electrode and a positive electrode separated by an electrolyte layer, which may include a separator, such as an ion-exchange membrane. The electrodes can be porous carbon materials, such as graphite felts or graphite papers. A negative liquid electrolyte is delivered to the negative electrode and a positive liquid electrolyte is delivered to the positive electrode to drive electrochemically reversible redox reactions. For example, the electrolyte can be a vanadium electrolyte solution that is prepared from $V_2O_5$ involving the chemical reduction of vanadium(V) to vanadium (IV) using oxalic acid.

SUMMARY

A method for treating a liquid electrolyte solution for use in a flow battery according to an example of the present disclosure includes (a) feeding a liquid redox electrolyte solution into a first half-cell of an electrochemical cell and feeding a gaseous reductant into a second half-cell of the electrochemical cell; and (b) electrochemically reducing at least a portion of the liquid redox electrolyte solution in the electrochemical cell using the gaseous reductant.

In a further embodiment of any of the foregoing embodiments, the liquid redox electrolyte solution initially is vanadium(IV) electrolyte solution, and the reduced portion of the liquid redox electrolyte solution is vanadium(III) electrolyte solution.

In a further embodiment of any of the foregoing embodiments, the gaseous reductant in step (b) is a hydrogen-containing gas.

In a further embodiment of any of the foregoing embodiments, step (b) includes using hydrogen as the gaseous reductant to electrochemically reduce substantially all of the liquid redox electrolyte solution from vanadium(IV) electrolyte solution to vanadium(III) electrolyte solution.

In a further embodiment of any of the foregoing embodiments, step (b) includes using the gaseous reductant to electrochemically reduce a portion the liquid redox electrolyte solution such that upon completion of step (b) there is a mixture of ionic species in the liquid redox electrolyte solution.

In a further embodiment of any of the foregoing embodiments, the mixture has approximately equimolar amounts of the ionic species.

A further embodiment of any of the foregoing embodiments includes feeding approximately half of the volume of the mixture to a negative side of a flow battery and feeding the remaining half of the volume of the mixture to a positive side of the flow battery.

A further embodiment of any of the foregoing embodiments includes electrolyzing water in-line with the electrochemical cell to feed hydrogen ($H_2$) as the gaseous reductant.

A further embodiment of any of the foregoing embodiments includes accelerating the electrochemical reduction by applying an electric current to the electrochemical cell during step (b).

A flow battery system according to an example of the present disclosure includes a flow battery that has a flow battery cell with a first pair of electrodes and a first electrolyte separator arranged between the first pair electrodes, and a supply/storage system external of the flow battery cell. The supply/storage system includes first and second vessels fluidly connected in respective first and second recirculation loops with the respective electrodes of the flow battery cell. An electrolyte process cell is external of the flow battery. The electrolyte process cell includes a second pair of electrodes and a second electrolyte separator arranged between the second pair of electrodes. One of the second pair of electrodes is configured for redox reactions with at least a gaseous reductant and the other of the second pair of electrodes is configured for redox reactions with a liquid redox electrolyte solution for the flow battery.

In a further embodiment of any of the foregoing embodiments, the electrode that is configured for redox reactions with at least the gaseous reductant includes a metal-electrocatalyst and the other of the second pair of electrodes excludes any metal-electrocatalyst.

A further embodiment of any of the foregoing embodiments includes an electrolyzer in-line with the electrolyte process cell, the electrolyzer configured to feed hydrogen to the electrolyte process cell.

A further embodiment of any of the foregoing embodiments includes another external supply/storage system including another vessel which is fluidly connected in a recirculation loop with one of the second pair of electrodes.

A further embodiment of any of the foregoing embodiments includes a gas supply system configured to provide the gaseous reductant to the one of the electrodes, and the gas supply system is an open-loop.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
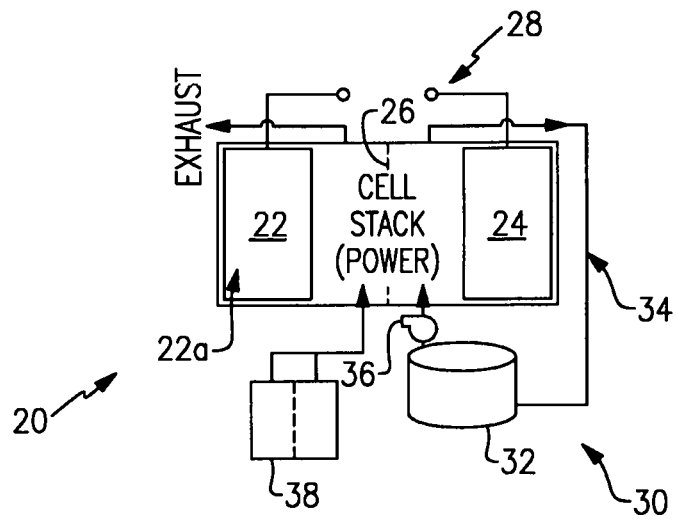
FIG. 1 illustrates an example electrolyte process cell for treating a liquid electrolyte solution for use in a flow battery.

Disclosed herein is an example method for treating a liquid redox electrolyte solution for use in a flow battery. The liquid redox electrolyte solution may include ions of elements that have multiple, reversible oxidation states in a selected liquid solution, such as but not limited to, aqueous solutions or dilute aqueous acids, such as 1-5M sulfuric acid. In some examples, the multiple oxidation states are non-zero oxidation states, such as for transition metals including but not limited to vanadium, iron, manganese, chromium, zinc, molybdenum and combinations thereof, and other elements including but not limited to sulfur, cerium, lead, tin, titanium, germanium and combinations thereof. In some examples, the multiple oxidation states can include the zero oxidation state if the element is readily soluble in the selected liquid solution in the zero oxidation state. Such elements can include the halogens, such as bromine, chlorine, and combinations thereof. The electrochemically active species could also be organic molecules that contain groups that undergo electrochemically reversible reactions, such as quinones, alcohols and ketones, which may be present in an ionically neutral aqueous or organic solution.

The preparation or treatment of liquid redox electrolyte solutions for flow batteries can be relatively expensive and complex. Using vanadium as a representative example, vanadium electrolyte solution can be produced from vanadium oxide ($V_2O_5$) powder by dissolving the powder in a solution, such as sulfuric acid, as vanadium(V), and then reducing the vanadium(V) to vanadium(IV). The Roman numerals designate the oxidation state of the vanadium but do not necessarily correspond to the oxidation state of the electrochemically active species. For example, the electrochemically active vanadium species in vanadium electrolyte solutions for flow batteries can be $VO_2^+$, $VO^{2+}$, $V^{3+}$, and $V^{2+}$, which correspond respectively to vanadium(V), vanadium(IV), vanadium(III), and vanadium(II).

At the volumes typically needed for a flow battery, the reduction of the vanadium(V) to vanadium(IV) can take approximately one day. After the reduction, the vanadium (IV) electrolyte solution can be transferred into the flow battery, which is then charged to produce vanadium(V) electrolyte solution on one side and vanadium(III) electrolyte solution on the other side. The charging operation can take approximately one day. The vanadium(V) electrolyte solution is then reduced to vanadium(IV) electrolyte solution using oxalic acid or other reducing agent so that the average vanadium oxidation state in the flow battery is about 3.5. This reduction requires a substantial amount of oxalic acid and is a relatively slow process that can take approximately three days. The alternative process is to start with twice as much vanadium (IV) electrolyte in the positive reservoir and remove half of the vanadium(V) after charging and recycle it, resulting in a 3.5 average oxidation state. The example method disclosed herein can be used to prepare a liquid redox electrolyte solution, such as vanadium electrolyte solution, with fewer steps and without the use of oxalic acid or other reducing agent, for example.

The method includes a feeding step and a reducing step. In the feeding step, an initial liquid redox electrolyte solution is fed into a first half-cell of an electrochemical cell and a gaseous reductant is fed into a second half-cell of the electrochemical cell. Then in the reducing step, at least a portion of the liquid redox electrolyte solution in the electrochemical cell is electrochemically reduced using the gaseous reductant.

Using vanadium electrolyte solution as an example, in one embodiment, there is a relatively low energy barrier for the reduction of the vanadium electrolyte solution and the electrochemical reaction is thus spontaneous. However, the reduction can be accelerated by applying a voltage to the electric circuit of the electrochemical cell to increase the electric current during the reducing step.

In a further example, the vanadium electrolyte solution initially is vanadium(IV) electrolyte solution, and the reduced portion of the vanadium electrolyte solution is vanadium(III) electrolyte solution. The half-cell reactions and potentials for such reactions are as follows:

$2V^{+4} + 2H^+ + 2e^- \rightarrow 2V^{+3}$ (+)

E=+0.34 V $H_2 \rightarrow 2H^+ + 2e^-$ (−)

E=−0.26 V $E_{overall}$=+0.60 V

The vanadium electrolyte solution can be either substantially fully reduced or only partially reduced, with respect to the beginning and ending concentrations of vanadium species, depending on how the vanadium electrolyte solution will be incorporated into a flow battery. For example, the gaseous reductant can be used to electrochemically reduce only a portion the vanadium electrolyte solution such that upon completion of the electrochemical reduction step there is a mixture of vanadium(IV) and vanadium(III) electrolyte solution.

The mixture can have an approximately equimolar concentration of vanadium(IV) and vanadium(III) species. Known methods, such as optical methods to determine state of charge, can be used to determine or estimate specie concentration. Approximately half of the volume of the mixture can then be fed to the negative side of the flow battery and the remaining half of the volume of the mixture can be fed to the positive side of the flow battery. The flow battery can then be charged by application of an external current and used in normal operation.

Alternatively, approximately half of the initial untreated volume of the vanadium electrolyte solution can be fed into the electrochemical cell and substantially fully electrochemically reduced from vanadium(IV) to vanadium(M) electrolyte solution. The vanadium(III) electrolyte solution and the untreated initial vanadium(IV) electrolyte solution and then be fed, respectively, to the positive and negative sides of the flow battery such that the flow battery begins at an approximately 0% state-of-charge rather than less than 0% state-of-charge that would occur if the mixture was provided to both sides of the flow battery. This also may avoid or reduce overpotentials that could occur.

FIG. 1 illustrates an example electrochemical cell, represented as electrolyte process cell 20, which can be used for the method described above. The electrolyte process cell 20 includes first and second spaced-apart electrodes 22/24 and an electrolyte separator 26 arranged between the electrodes 22/24. The electrodes 22/24 are connected to an electric circuit 28. The first electrode 22 is configured for redox reactions with at least a gaseous reductant, but more typically with each of a gaseous reductant and a gaseous oxidant. The second electrode 24 is configured for redox reactions with the liquid redox electrolyte solution, such as the vanadium electrolyte solution.

In one example, the first electrode 22 includes a metal-electrocatalyst 22a and the second electrode 24 excludes any metal-electrocatalyst. The electrocatalyst 22a can be a noble metal such as, but not limited to, platinum and alloys of platinum. In further examples, the noble metal catalyst can be selected to be active for the target gaseous reductants and gaseous oxidants that are to be used, such as hydrogen and oxygen (as air or pure oxygen). The electrocatalyst 22a can be a supported electrocatalyst such as, but not limited to, noble metals deposited and supported on support particles. The second electrode 24 can be a carbon electrode, similar to the electrodes of the cell of a flow battery, described in further detail below.

The electrolyte process cell 20 can include an external supply/storage system 30 that comprises at least one vessel 32 fluidly connected in a recirculation loop 34 with the second electrode 24. The vessel 32 can hold the liquid redox electrolyte solution for recirculation through the second electrode 24 during operation of the electrolyte process cell 20. In a further example, the external supply/storage system 30 is excluded and the recirculation loop 34 can be connected to a flow battery. The recirculation loop 34 may also include a pump 36 to facilitate the recirculation of the liquid redox electrolyte solution.

At least one gaseous reactant source 38 is operable to provide one or more gaseous reactants, such as hydrogen- or oxygen-containing gases, to the first electrode 22 in an open loop. That is, once used in the electrolyte process cell 20, the reactant and/or byproduct is exhausted rather than recirculated through the electrolyte process cell 20.

In further examples, at least one of the gas sources can be a pressurized gas tank. Additionally or alternatively, at least one of the gas sources can be an electrolyzer, for water electrolysis and in-line feeding of hydrogen to the first electrode 22 as a gaseous reductant. The electrolyzer can be operated in an on-demand basis to provide gaseous reductant. In further examples, in the case of oxygen as an oxidizing gaseous reactant source, air can be provided by using an air blower (or compressor) or, alternatively, the electrolyzer can be used to provide a pure oxygen stream on-demand. A valve can be provided to control the feed of gas, with respect to which gaseous reactant and the flow rate. For example, a controller having software, hardware, or both may be used to control the valve and gas flow.

The electrolyte process cell 20 can thus be used to prepare, or treat, a liquid redox electrolyte solution for use in a flow battery without directly adding a separate reducing agent such as oxalic acid to the flow battery. Additionally, the method of preparing the liquid redox electrolyte solution using the electrolyte process cell 20 can reduce the preparation time and risk of damage to a flow battery in comparison to methods utilizing a reducing agent directly and can permit preparation without utilizing a flow battery to "finish" the solution.

The electrolyte process cell 20 can also be used to perform periodic maintenance on a flow-battery electrolyte. For example, in the vanadium electrolyte case the average oxidation state should be 3.5. If the average oxidation state is higher than 3.5, then a mixture of the electrolyte (vanadium(V) and vanadium(IV)) can be electrochemically reduced according to method such that a portion of the vanadium(V) reduces to vanadium(IV). Similarly, if the average oxidation state is less than 3.5, one could use oxygen (or air) to oxidize the mixture.

Figure 2:
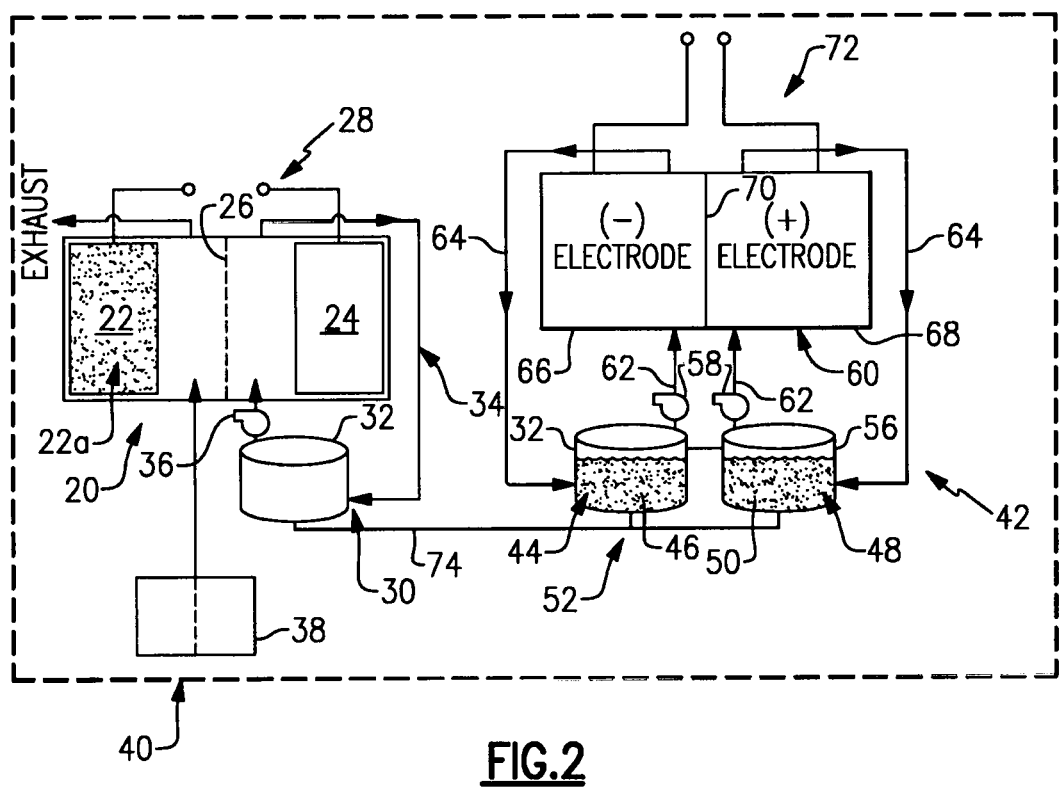
FIG. 2 illustrates an example flow battery system that includes an electrolyte process cell.

The method and electrolyte process cell 20 can also be employed in combination with a flow battery, an example of which is illustrated in a flow battery system 40 in FIG. 2. In this example, the system 40 includes a flow battery 42 and the electrolyte process cell 20. The flow battery 42 includes a fluid electrolyte 44 that has an electrochemically active specie 46 which, under charge and discharge conditions, functions in a redox pair with regard to an additional fluid electrolyte 48 that has an electrochemically active specie 50. The fluid electrolytes 44/48 (liquid redox electrolyte solutions) are contained in a supply/storage system 52 that includes first and second vessels 54/56 and pumps 58.

The fluid electrolytes 44/48 are circulated from the first and second vessels 54/56, using the pumps 58, to at least one cell 60 42 through respective feed lines 62. The fluid electrolytes 44/48 are returned from the cell 60 to the vessels 54/56 via return lines 64. The feed lines 62 and the return lines 64 connect the vessels 54/56 with, respectively, first and second electrodes 66/68 of the cell 60. Multiple cells 60 can be provided as a stack or in other configurations.

The cell or cells 60 each include the first electrode 66, the second electrode 68 spaced apart from the first electrode 66, and an electrolyte separator layer 70 arranged between the first electrode 66 and the second electrode 68. For example, the electrodes 66/68 are porous carbon structures, such as carbon paper or felt. The surfaces of the carbon structures can be active with regard to the electrochemically active species 46/50 without the specific addition or use of metal-electrocatalysts, such as noble metals. In the redox reactions involving the vanadium electrolyte solution, the energy barriers to the reactions are relatively low, and thus metal-electrocatalyst materials are not typically required, as with electrochemical devices that utilize gaseous reactants such as oxygen or hydrogen. In one further example, the electrode material is carbon and it is activated using a prior thermal and/or chemical treatment process to clean the carbon material and produce carbon surfaces that serve as active electrochemical sites.

In general, the cell or cells 60 can include bipolar plates, manifolds and the like for delivering the fluid electrolytes 44/48 through flow field channels to the electrodes 66/68. The bipolar plates can be carbon plates, for example. It is to be understood, however, that other configurations can be used. For example, the cell or cells 60 can alternatively be configured for flow-through operation where the fluid electrolytes 44/48 are pumped directly into the electrodes 66/68 without the use of flow field channels.

The electrolyte separator layer 70 can be an ionic-exchange membrane, an inert micro-porous polymer membrane or an electrically insulating microporous matrix of a material, such as silicon carbide (SiC), that prevents the fluid electrolytes 44/48 from freely and rapidly mixing but permits selected ions to past through to complete the redox reactions while electrically isolating the electrodes 66/68. In this regard, the fluid electrolytes 44/48 are generally isolated from each other during normal operation of the flow battery 42, such as in charge, discharge and shutdown states.

The fluid electrolytes 44/48 are delivered to the cell 60 to either convert electrical energy into chemical energy or, in the reverse reaction, convert chemical energy into electrical energy that can be discharged. The electrical energy is transmitted to and from the cell 60 through an electric circuit 72 that is electrically coupled with the electrodes 66/68.

The vessel 32 of the electrolyte process cell 20 can be connected by one or more lines 74 with one or both of the vessels 54/56 of the flow battery 42, for transferring liquid redox electrolyte solution, such as the fluid electrolytes 44/48, there between. The lines 74 may include one or more pumps and valving for controlling such transfer. Alternatively, the lines 74 could be excluded and the liquid redox electrolyte solution transferred manually.

In operation, the electrolyte process cell 20 can be used to prepare, or treat, the fluid electrolytes 44/48 for use in the flow battery 42. Although not limited, the electrolyte process cell 20 can be used to initially prepare the liquid redox electrolyte solution according to the method described above, in the desired oxidation state or states for subsequent use in the flow battery 42. The electrolyte process cell 20 can also be used for a maintenance process to adjust the average oxidation state of the electrolyte due to side-reactions which occur slowly during operation of the flow battery 42.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method for treating a liquid electrolyte solution for use in a flow battery, comprising:
    (a) feeding a liquid redox electrolyte solution into a first half-cell of an electrochemical cell and feeding a gaseous reductant into a second half-cell of the electrochemical cell;
    (b) electrochemically reducing at least a portion of the liquid redox electrolyte solution in the electrochemical cell using the gaseous reductant, wherein said step (b) includes using the gaseous reductant to electrochemically reduce a portion the liquid redox electrolyte solution such that upon completion of said step (b) there is a mixture of ionic species in the liquid redox electrolyte solution; and
    (c) feeding approximately half of the volume of the mixture to a negative side of a flow battery and feeding the remaining half of the volume of the mixture to a positive side of the flow battery.

2. The method as recited in claim 1, wherein the liquid redox electrolyte solution initially is vanadium(IV) electrolyte solution, and the reduced portion of the liquid redox electrolyte solution is vanadium(III) electrolyte solution.

3. The method as recited in claim 1, wherein the gaseous reductant in said step (b) is a hydrogen-containing gas.

4. The method as recited in claim 1, wherein the mixture has approximately equimolar amounts of the ionic species.

5. The method as recited in claim 1, further comprising electrolyzing water in-line with the electrochemical cell to feed hydrogen ($H_2$) as the gaseous reductant.

6. The method as recited in claim 1, further comprising accelerating the electrochemical reduction by applying an electric current to the electrochemical cell during said step (b).

7. A method for treating a liquid electrolyte solution for use in a flow battery, comprising:
    (a) feeding a liquid redox electrolyte solution into a first half-cell of an electrochemical cell and feeding a gaseous reductant into a second half-cell of the electrochemical cell;
    (b) electrochemically reducing at least a portion of the liquid redox electrolyte solution in the electrochemical cell using the gaseous reductant, wherein said step (b) includes using the gaseous reductant to electrochemically reduce a portion the liquid redox electrolyte solution such that upon completion of said step (b) there is a mixture of ionic species in the liquid redox electrolyte solution, wherein the mixture has approximately equimolar amounts of the ionic species.

8. The method of 7, further comprising feeding approximately half of the volume of the mixture to a negative side of a flow battery and feeding the remaining half of the volume of the mixture to a positive side of the flow battery.

9. The method as recited in claim 7, wherein the liquid redox electrolyte solution initially is vanadium(IV) electrolyte solution, and the reduced portion of the liquid redox electrolyte solution is vanadium(III) electrolyte solution.

10. The method as recited in claim 7, wherein the gaseous reductant in said step (b) is a hydrogen-containing gas.

11. The method as recited in claim 7, further comprising electrolyzing water in-line with the electrochemical cell to feed hydrogen ($H_2$) as the gaseous reductant.

12. The method as recited in claim 7, further comprising accelerating the electrochemical reduction by applying an electric current to the electrochemical cell during said step (b).

* * * * *